April 26, 1955

C. A. THOMAS 2,706,965

RECEPTACLE FOR MILKING APPARATUS

Filed April 6, 1951

Inventor:
Chester A. Thomas,
By Schroeder, Merriam,
Hofgren & Brady, Attys.

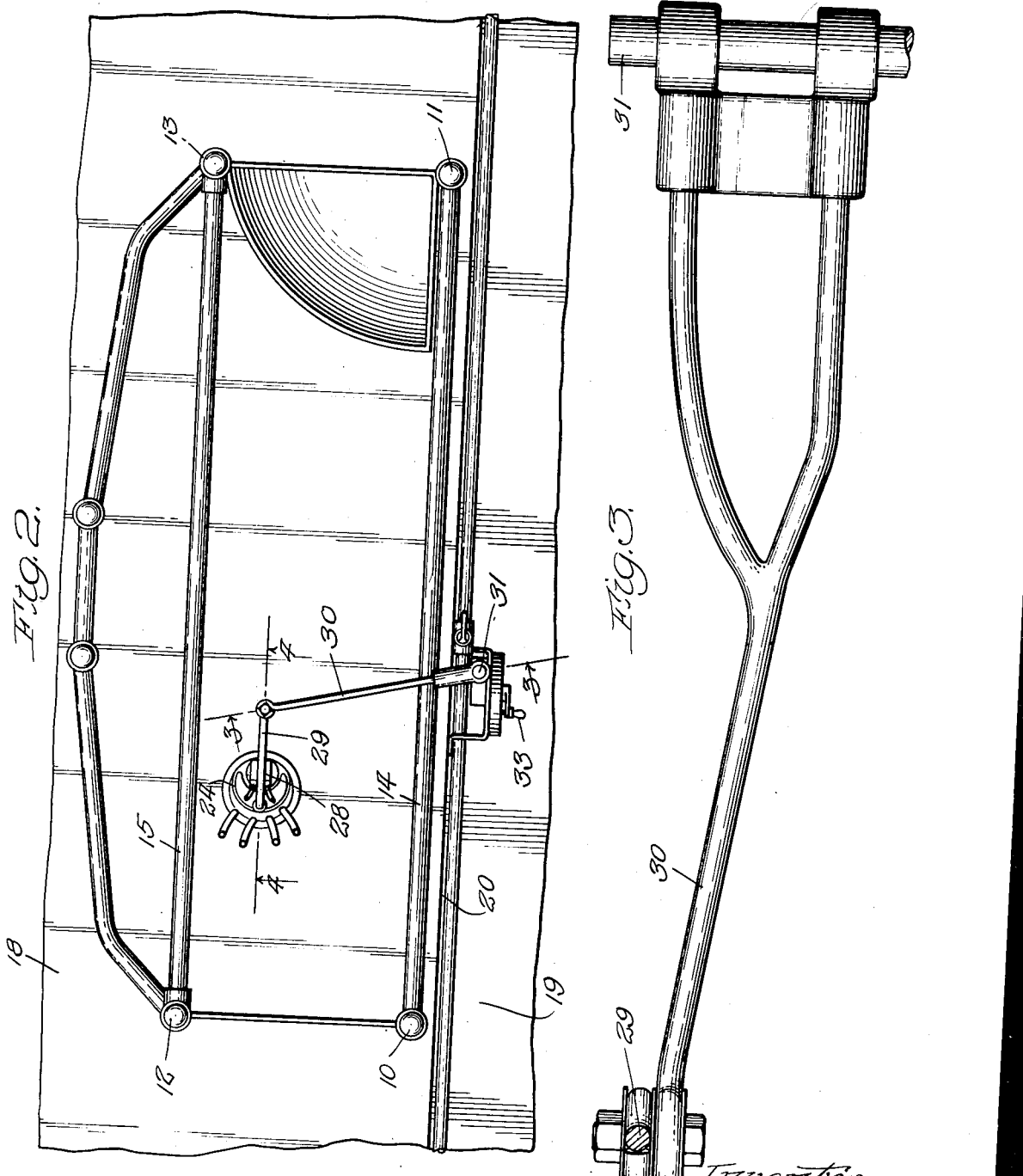

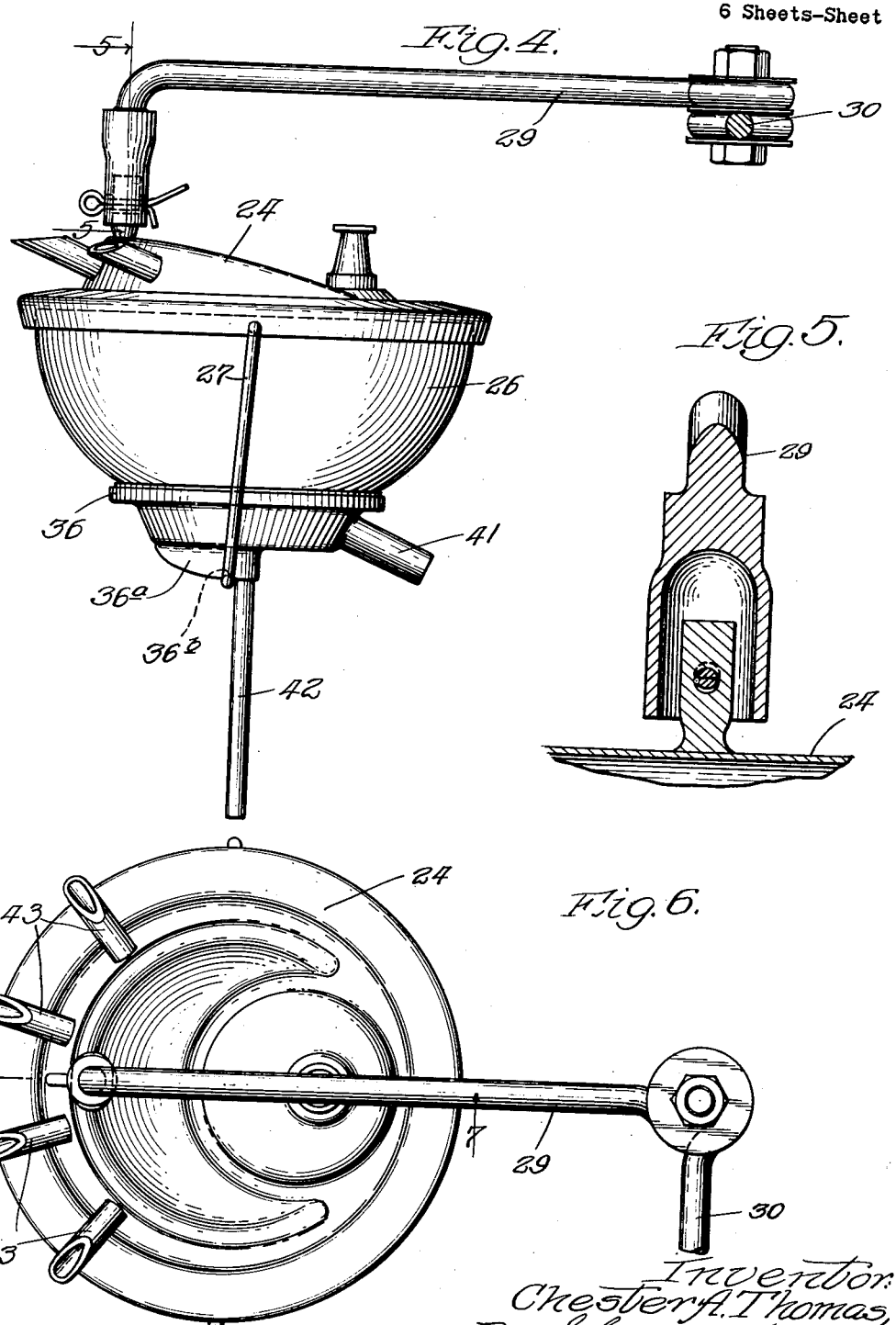

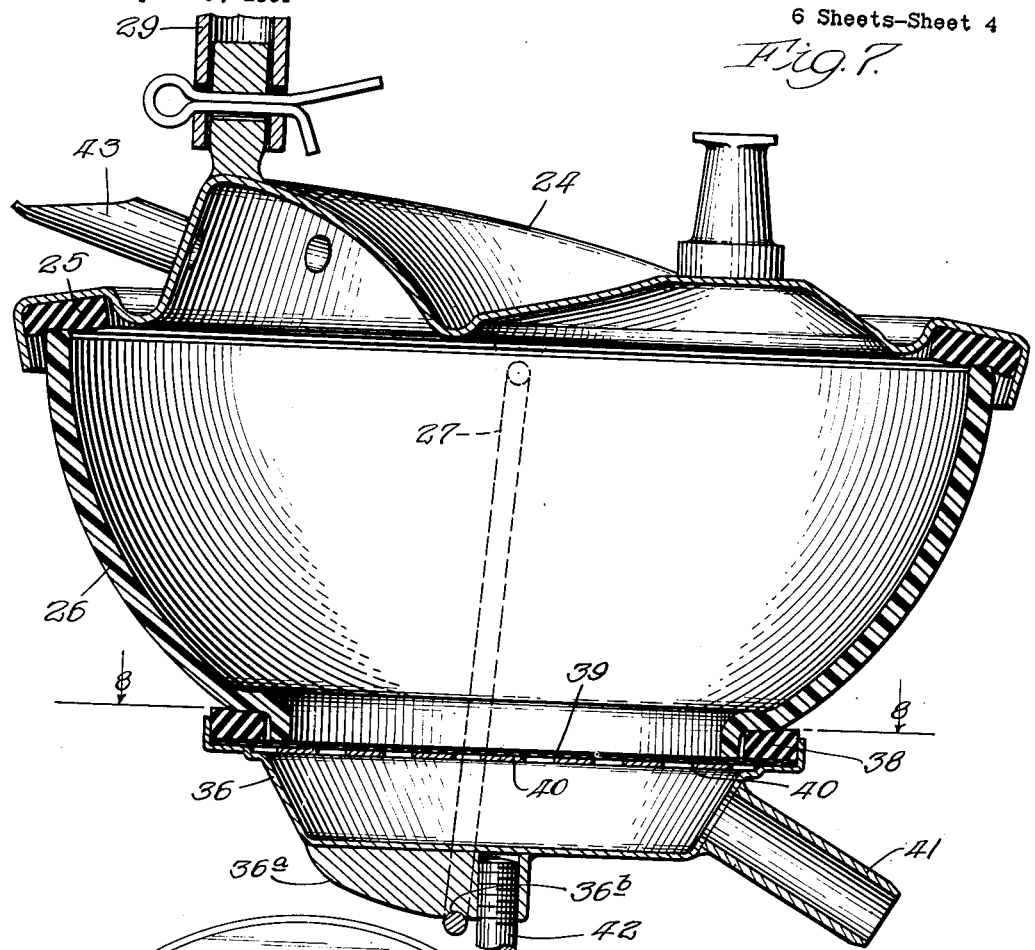
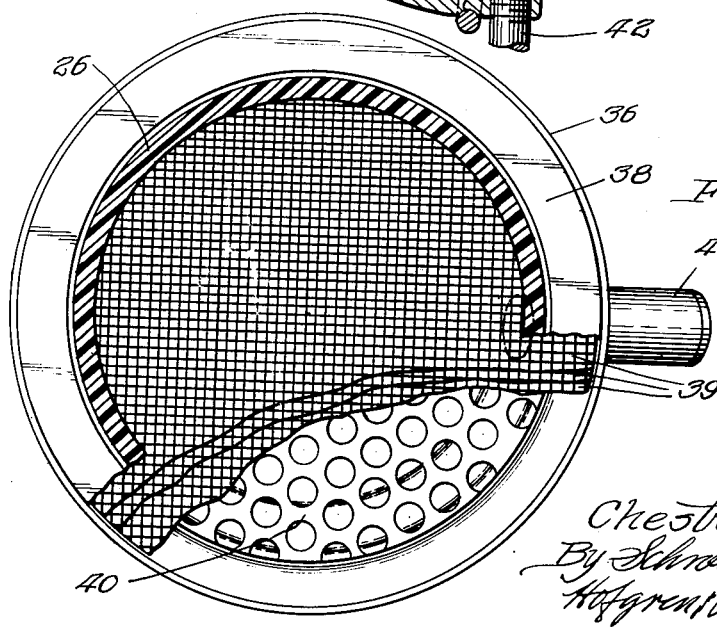

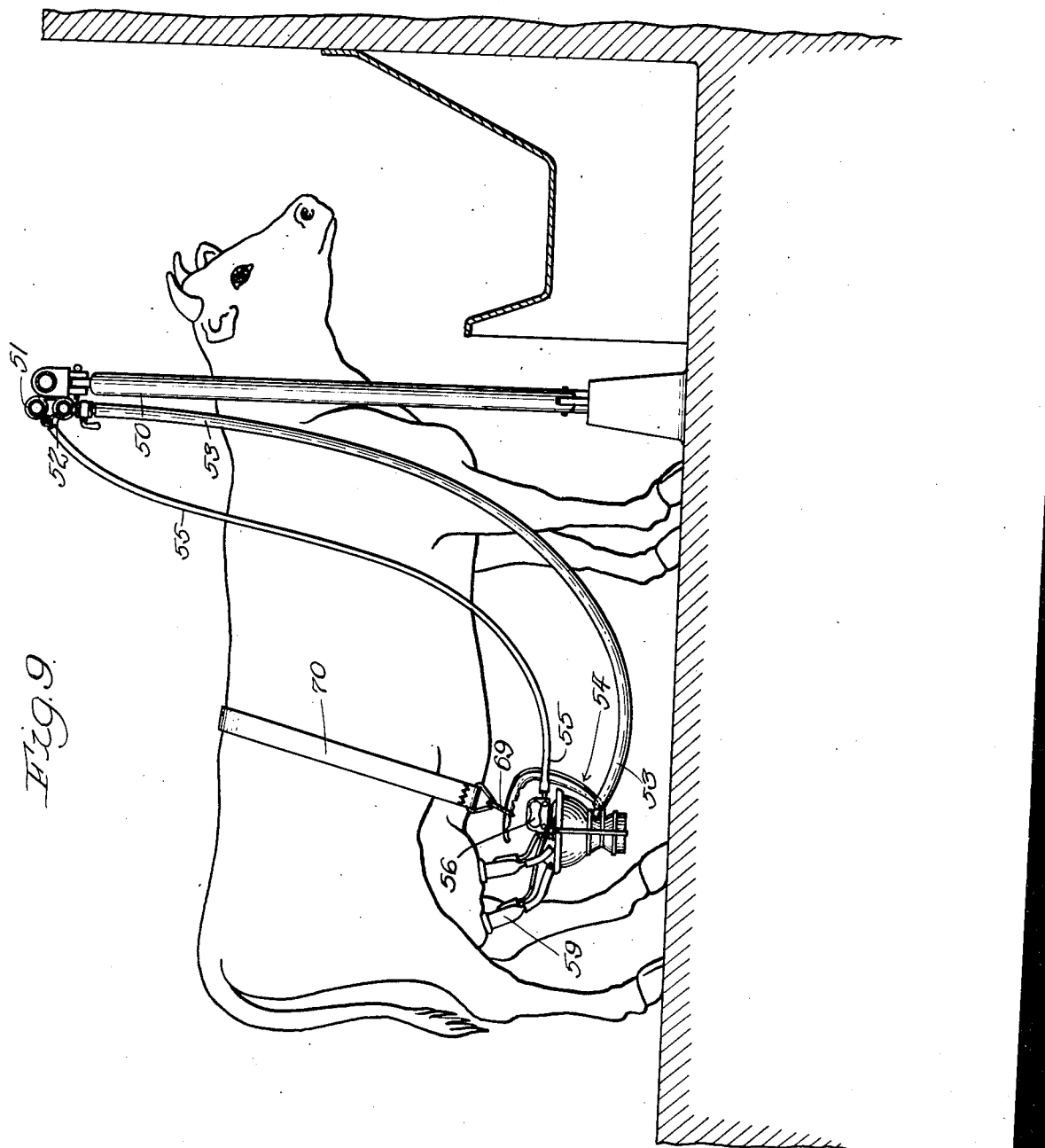

April 26, 1955

C. A. THOMAS 2,706,965

RECEPTACLE FOR MILKING APPARATUS

Filed April 6, 1951

Inventor:
Chester A. Thomas,
By Schrader, Merriam,
Hofgren & Brady, Attys.

2,706,965

RECEPTACLE FOR MILKING APPARATUS

Chester A. Thomas, Lake Forest, Ill., assignor to Babson Bros. Co., a corporation of Illinois Application April 6, 1951, Serial No. 219,692

6 Claims. (Cl. 119—14.01)

This invention relates to a milk receptacle, especially for use in the machine milking of cows, and more particularly to a milking receptacle for use in an apparatus adapted to pipe milk directly from a cow to a milk can or any other appropriate delivery point.

This application is a continuation-in-part of my co-pending application Serial No. 208,869 filed February 1, 1951, now abandoned.

One feature of this invention is that it provides a milk receptacle of sturdy construction; another feature of this invention is that it provides a milk receptacle which simplifies the maintenance of sanitary standards; yet another feature of this invention is that it provides a convenient and simple arrangement for filtering milk going into or through a pipe line system; a further feature of this invention is that it provides a milk receptacle having means adapted to prevent contaminating contact of the teat cup assemblies with the floor in the event one or more of them are hanging down during use; yet a further feature of this invention is that it provides a transparent bowl which enables the operator to observe the passage of milk therethrough; a still further feature of this invention is that it provides a transparent milk bowl which may receive rough handling without fracture.

Another feature of this invention is that it provides means whereby an ordinary milking system, wherein milk received from a cow is retained in the milk withdrawing apparatus, may readily be connected into a carry-away system wherein the milk withdrawn is piped to any desired point remote from the cow. A further feature of this aspect of the invention is the provision of means to be attached to the cow for withdrawing milk from the cow and directing it into a pipe line of a carry-away system, the means being so designed as to produce the necessary and desired downward and forward tug and pull on the udder as the milking progresses.

Other features and advantages of this invention will be apparent from the following specification and the drawings, in which:

Fig. 2 is a top plan view of the apparatus of Fig. 1 with the cow omitted;

Fig. 3 is an enlarged view taken along the lines 3—3 of Fig. 2 showing a portion of the arm which positions the receptacle with reference to the cow and also maintains pull on the receptacle and teat cup assemblies during milking;

Fig. 4 is an enlarged view of the receptacle shown in Fig. 1, showing a means of attaching the receptacle to the positioning arm;

Fig. 5 is an enlarged sectional view taken on the lines 5—5 of Fig. 4 showing the attachment means whereby the receptacle is suspended from the positioning arm;

Fig. 6 is an enlarged view of a portion of Fig. 2 showing the receptacle lid, a portion of the positioning arm and the teat cup nipples attached to the receptacle lid;

Fig. 7 is an enlarged sectional view of the receptacle shown in Fig. 4;

Fig. 8 is a sectional view taken along the lines 8—8 of Fig. 7 showing a filter retained in place in the receptacle base;

Fig. 9 is a view like Fig. 1 showing a modified form of the invention;

Figure 1:
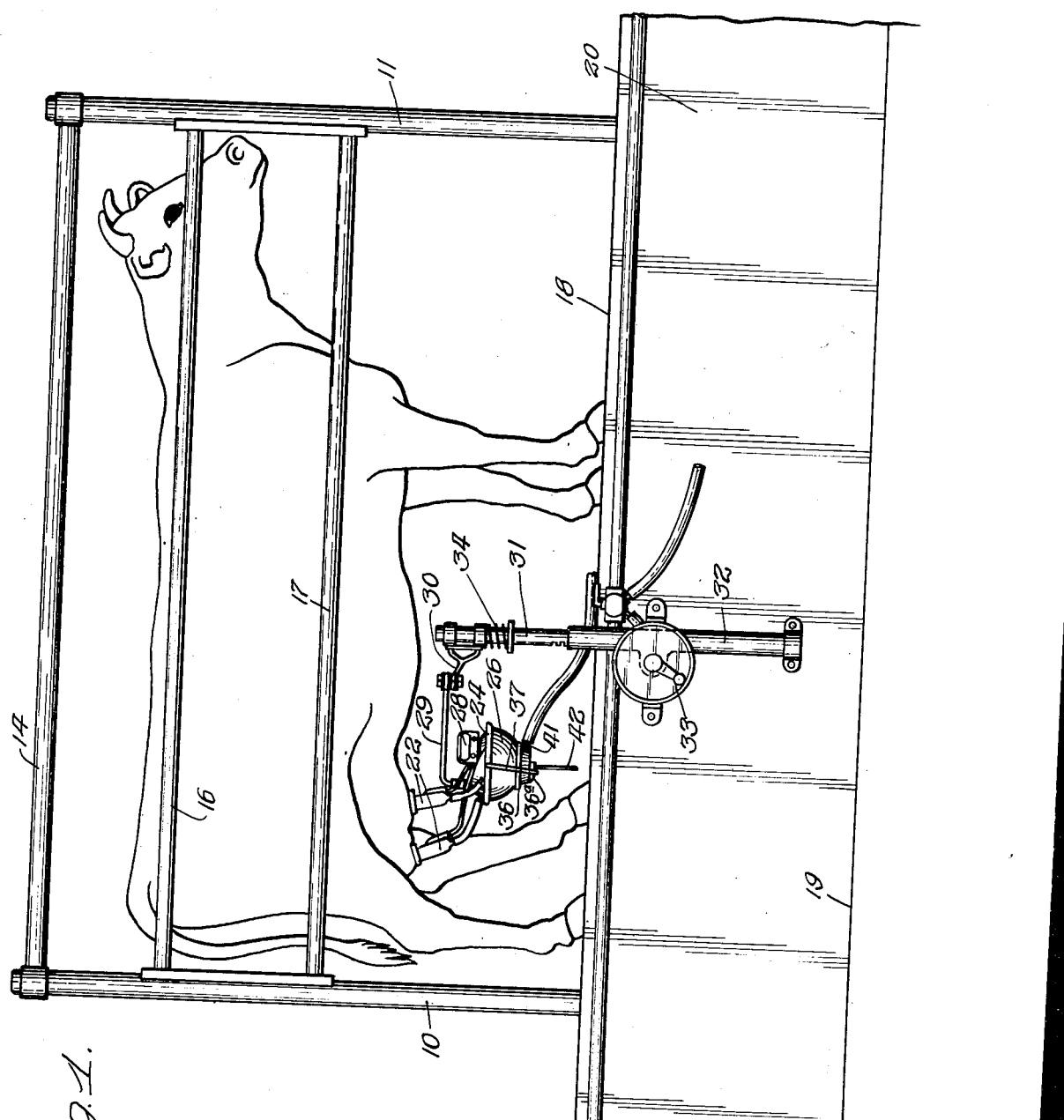
Fig. 1 is a view of a cow being milked by an apparatus incorporating the receptacle of this invention.
Figure 10:
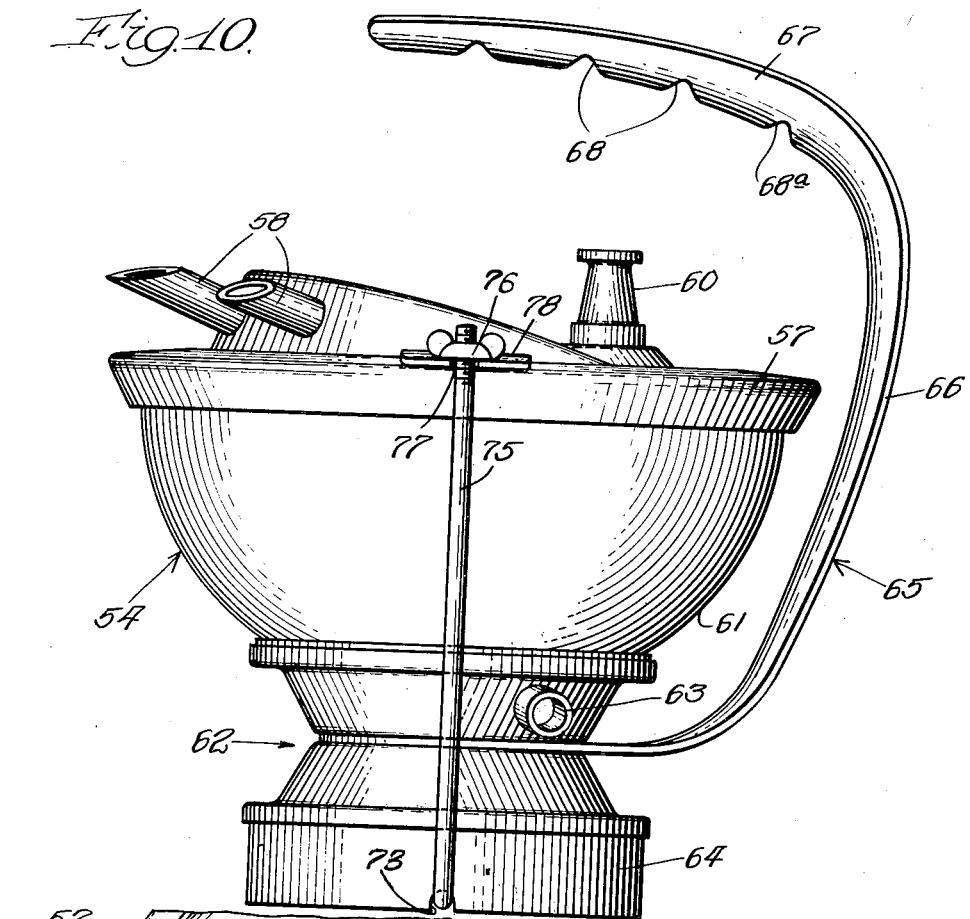
Fig. 10 is an enlarged side elevation of the receptacle used in the modified form of invention illustrated in Fig. 9.
Figure 11:
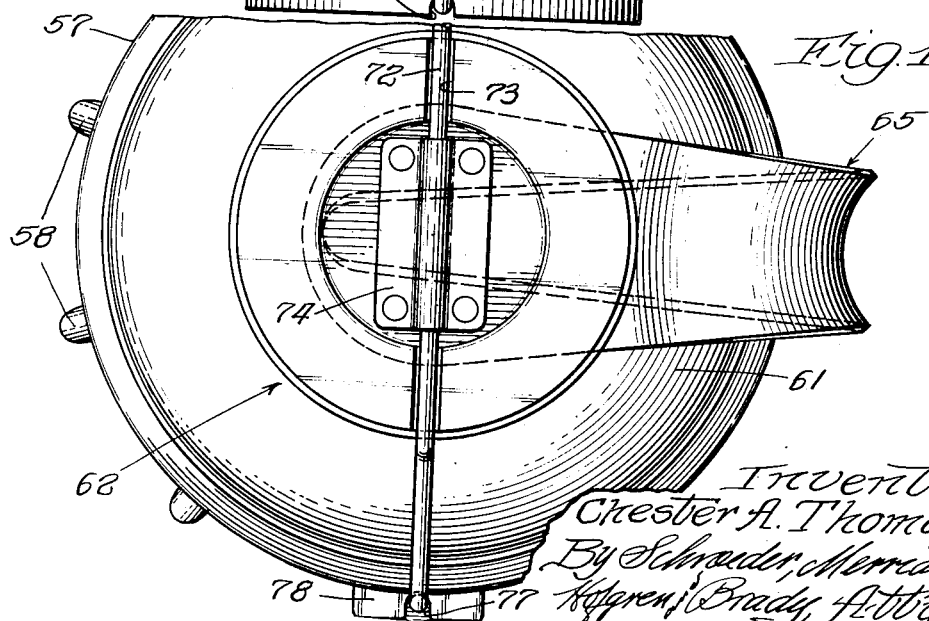
Fig. 11 is a partial bottom plan view of the receptacle shown in Fig. 10.

In the particular embodiment of the invention illustrated in Fig. 1, the milking parlor is illustrated as employing the "drop" system, with the cow floor being at a higher level than the operator's floor or alley. Milking parlors of this general type are more fully described in a number of issued patents, and reference may be had, for example, to Babson et al. Reissue Patent No. 22,368 and Babson et al. Patent 2,477,035 to supplement the present disclosure with respect to the general features of such milking parlors and stalls. In such milking parlors the cows, after any desired preliminary washing of the udder, or other preparation, are admitted to a stall, as for example the stall shown in Figs. 1 and 2 including the vertical uprights 10, 11, 12 and 13, the overhead horizontal bracing members here identified as 14 and 15, and side horizontal members, as for example, those identified as 16 and 17. The stall illustrated is shown in simplified form without a feed chute, gate operating equipment and the like, for convenience and simplicity of illustration. It will be understood that in commercial practice the stall would normally include such additional equipment or accessories as those mentioned above, and others illustrated and described in the above mentioned patents.

In the system illustrated, the cow stands on a floor, here identified as 18, which would be at some suitable higher level (as two feet) above an operator's floor or alley here identified as 19, a vertical wall 20 connecting the two floor levels. While I prefer to have a stepped arrangement of stalls and floors as illustrated in the above mentioned patents, the stall is here shown as parallel to the wall 20 for simplicity of illustration.

The milking apparatus in which the present invention is particularly adapted for use and the apparatus here illustrated and described is of a kind sometimes known in the trade as a "carry-away" type to distinguish it from a milking machine which receives a given amount of milk directly in its bucket and which must be emptied between the milking of each cow. The system illustrated here is of a character which can be attached to cows as they move into a stall of a milking parlor and which will then carry the milk away from the cow to a desired ultimate point; i. e., the milking apparatus itself will, without an operator having to handle and empty a bucket, deliver milk to a tube or pipe adapted to deliver it to any desired point, either a milk can immediately adjacent the milking stall or at some remote point or through a sanitary pipe line to other apparatus found in the milk houses and dairy installations of the larger dairy farms, as coolers, storage tanks, pasteurizers or the like. The general character and nature of such a system will only be described here to such an extent as is necessary to enable an understanding of the proper relation to the remainder of the system of the particular embodiment of the portion of the system to which this application is directed.

In general, as may be seen by reference to Fig. 1, the system shown therein includes four teat cup assemblies of identical character, one being here identified as 22. Each such teat cup assembly comprises a rigid outer shell and a flexible inner element termed an inflation, this inflation comprising a larger generally cylindrical body adapted to receive the teat being milked, and usually comprising an integral short milk tube extending therefrom and forming a part of the milk passageway delivering milk on through various supplemental parts of the passageway to the desired ultimate destination point. Such teat cup assemblies and inflations are so well known and have been so long used in the field that it is not felt that further illustration or description is necessary. The four teat cup assemblies may be connected together in any desired manner to deliver milk to a single flow passageway, being here shown as having their milk tubes connected to nipples on a lid here identified as 24, this lid forming the top of a milk receiving chamber of substantial size, the remainder of the chamber being provided by a bowl shaped element here identified as 26.

The lid carries, suitably mounted thereon, a pulsator 28 of a type well known and conventional in the field, and the entire bowl assembly is supported by apparatus including a pair of pivotally interconnected arms 29 and 30 in turn supported on a vertically adjustable post 31.

The particular adjustable supporting arrangement illustrated in Fig. 1 is of the general type more fully shown and described in Babson et al. Reissue Patent No. 22,368. The post 31 may be vertically adjusted to a desired position by telescopic movement within a tube 32 in turn suitably mounted, this mounting being here illustrated as on the side of the wall of the milking parlor installation, although it will be understood that this is representative only. Adjustment may be effected by the handle 33 through a rack and gear arrangement; and a spring 34 is adapted to place continuous forward force on the milking apparatus during milking, so that by appropriate adjustment of the height of the support a downward and forward intermittent tug and pull will be applied to the teat during milking with an intermittent effect due to the pulsator action. The height adjustment is preferably made in such a manner that when the teat cups are placed on the teats there is some upward bending of at least the arm 29, so that the springiness of this arm provides the downward component of force which, together with the forward component of force from the spring 34, provide a steady downward and forward force which is converted into a periodic tug and pull on the teats as a result of pulsator operation and movement of the teat cup assemblies on the teats due to changes in vacuum.

The cup or bowl 26 (preferably of transparent material as Lucite or Plexiglas or other non-shattering and non-cold flowing transparent plastic, to facilitate checking the progress of milking and the condition of the milk) provides a chamber of substantial area or capacity enabling each "pulse" of milk delivered from the inflation to separate from the ends of the milk tubes and not be drawn back around the teats as the inflations expand on the next portion of pulsator operation, providing a desired "break" in the milk stream. The milking, of course, is of the double acting type conventional for several decades, alternate evacuation of air from and admission of air to the space between the rigid outer shells and the inner inflations being effected by the pulsator 28 through appropriate pulsator hoses or tubes.

Referring now more particularly to Figures 3 to 8, inclusive, the general construction of the bowl 26 and its associated parts will be described in order to better bring out the present invention and its relation to the remainder of the milking system illustrated. The bowl may be of convenient size, as for example of the order of a quart, and is adapted to have sealed to its top, as by a gasket 25, the lid 24. The lid illustrated is of a type heretofore used on milking machines and is the subject of Thomas Design Patent 156,852. A removable connection of appropriate type is provided between the supporting arm 29 and the lid 24; and means are provided for holding a bottom closure 36 on the bowl, this being here shown as in the form of a snap bail 27 which snaps over a recessed grove 36b in a lug 36a which is integral with the bottom closure 36. This bottom closure for the main body of the bowl is adapted to be sealed to the bowl by another gasket 38, which may be best seen in Figure 7; and a filter pad of conventional type, here identified as 39, may be supported by a perforated plate 40 so that milk leaving the bowl 26 through the outlet connection pipe or nipple 41 will be filtered in desired manner.

The bottom closure 36 is preferably constructed of a corrosion resistant metal such as stainless steel. When the parts represented by the bowl 26, bottom closure 36 and nipple 41 were constructed of a single piece of molded plastic, they placed a severe pulling strain on the nipple 41 which frequently resulted in its fracture near where it was fastened to the bowl. In the present construction the nipple 41 and bottom closure 36 may be made of metal thereby eliminating a weak point. Having the bottom closure 36 detachable from the bowl 26 also provides a convenient location for a filter as will be further described below.

As previously mentioned the bowl 26 is preferably made of a transparent plastic. The lid 24 and base 36 are preferably made of a metal or metal alloy such as stainless steel and are held in position by the bail 27 which is pivoted from the edge of the lid 24 as best shown in Fig. 4. The bowl 26 is readily clamped between the lid 24 and the bottom closure or base 36. The bowl 26 is then compressed between the two metal pieces, thereby effecting a very satisfactory assembly.

Referring to Figs. 7 and 8, the filtration means may be seen to consist of several layers of filter pads 39 over the perforated plate 40. The plate 40 seats in an annularly indented portion of the bottom closure 36 as best shown in Fig. 7. The filter pads 39 extend beyond the periphery of the perforated plate 40 and are maintained in position by the gasket 38. In order to change the filter pads it is necessary only to unsnap the bail 27 and remove the bowl 26 from the bottom closure 36. Removal of the gasket then exposes the filter pads which may be replaced. The perforated plate 40 may also be lifted out when it is desired to clean it.

A bottom leg 42 is threadably attached to the base 36. This bottom leg 42 serves as a convenient means for holding the receptacle assembly and also as a limiting member to limit the downward movtment of the receptacle thereby to prevent contact of the teat cup assemblies with the floor. Occasionally a cow has such a low udder that the leg 42 would contact the floor while the cow was being milked. To avoid this, the leg 42 is made removable so that it may be omitted during milking of such an occasional cow, or, if preferred, the leg may be pivotally connected to the base so that it may be swung up out of the way.

The lid 24 is equipped with four nipples 43 (Fig. 6) to which are attached the teat cups 22. Fig. 1 illustrates the method of operation using the teat cups 22 and the milk receptacle which is the subject of this application. Prior to the time the cow has assumed proper milking position, the spring 34 has positioned the teat cup assembly a little forward of the position shown in Fig. 1. With the cow in position the operator places the teat cups on the cow and in so doing pulls the assembly toward the cow's udder thereby placing the spring 34 under slight tension. Vertical adjustment of the height is effected by turning the handle 33 in the desired direction. The milking cycle is then started and the progress observed through the transparent bowl or breaker cup 26.

When it is desired to replace the filter pads 39 it is a simple matter to do so by unsnapping the bail 27 and placing fresh filter pads over the perforated plate 40. At this time, the bottom leg 42 is used to hold the base 36. If the operator's grip should slip the bottom leg 42 will help to prevent contaminating contact between the floor 18 and the bottom closure 36.

My invention provides a strong milk receptacle which is well sealed from the outside, thereby insuring the easy maintenance of sanitary standards. At the same time, this device can be readily disassembled for the washing or cleaning necessary after completion of each milking period, and for changing of the filter.

The embodiment of the invention hereinabove described is particularly designed for use in a so-called "parlor stall" dairy installation. The invention of this application is also useable to convert the ordinary type of milking system, wherein the milk withdrawn from a cow is retained in the milk bucket at the cow (such as shown in the McCornack Patent 1,859,213), into a "carry-away" system. This conversion can be made very simply and with a minimum of expense.

Referring now to Fig. 9, there is illustrated an ordinary stall having a stanchion 50, the stall being equipped with a vacuum line 51 which may be the vacuum line previously installed for use with the ordinary milking system. To convert this system to a "carry-away" system, a second vacuum line 52 to carry away the milk is installed in the stall and connected, through the shut-off valve shown, to a flexible pipe 53 which, in turn, is connected to the milk withdrawing apparatus 54. A flexible line 55 is used to connect the pulsator 56 affixed to the lid of the apparatus 54 to the line 51.

Most of the details of the milk withdrawing apparatus 54 are similar to those previously described herein and hence will not be further described in detail. Thus, the receptacle 54 includes a lid 57 provided with a number of nipples 58 to be secured to the teat cup assemblies 59 and with a boss 60 to which the pulsator is secured. The lid 57 is secured in air-tight relationship to the top of a transparent open bottomed bowl 61, the botom of the bowl being closed by a base member 62 provided with a nipple 63 to be connected to the milk line 53. The base is provided with a heavy metal weight 64 secured thereto to produce the necessary downward pull on the teats as the milking progresses. The magnitude of the weight is such as to bring the receptacle to an empty weight of between fifteen and twenty pounds, with a gross empty weight of eighteen pounds being preferred. Secured to the base is a cantilever handle 65 which has a portion 66 extending vertically upwardly alongside of the bowl 61 and a curved top portion 67 curving back over the top of the lid. The portion 67 is provided with a plurality of notches 68 each adapted to be placed in a bow 69 provided on the bottom of a surcingle 70 adapted to be suspended from the back of the cow.

A U-shaped latch bail 72 has its base located in a recessed portion 73 extending across the bottom of the base and is rotatably secured in the recess by a cover plate 74. The arms 75 of the bail extend upwardly on either side of the receptacle 54 and are threaded at their upper ends to receive wing nuts 76. The upper ends of the bail are receivable in a notch 77 provided in a fitting 78 secured to the lid so that by tightening the wing nuts 76 the lid, base and bowl may be firmly held together; with the gaskets previously described seating in their respective seats to provide an air and fluid-tight container. When it is desired to separate the various parts of the receptacle for cleaning, the wing nuts 76 may be loosened and the latch bail 72 pivoted out of the way.

In using the device of this invention in the manner illustrated in Fig. 9, the vacuum line 55 is secured to the pulsator 56 while the vacuum milk line 53 is secured to the nipple 63. The portion 67 of the handle is then placed in the bow 69 of the surcingle 70 which has been previously attached to the cow, with the bow positioned in one of the notches 68. The notches 68 are provided so that the forward pull on the teats may be regulated as required, being less for an easy milking cow and up to the maximum forward pull (by using the notch 68a nearest the vertical portion of the handle) for a hard milking cow. The surcingle is drawn forwardly as illustrated in Fig. 9 to provide the forward component of force during the milking operation and, of course, the weight 64 provides the downwardly component as previously described. If desired, the receptacle may be secured to an independent support such as shown in said Patent Reissue 22,368.

Inasmuch as the receptacle 54 is not provided with a leg, such as shown on the previously described embodiment, it is preferable that the overall height of the receptacle be such as to prevent the teat cups from touching the floor should they all become loosened during the milking operation. Should all of the teat cups fall from the udder of the cow, the milking apparatus would swing forward until it was vertically beneath the surcingle, in which position its bottom may be resting upon the floor. The height of the apparatus is such that, should this occur, the teat cups are prevented from resting on the floor and thus the danger of sucking debris into the milk line is avoided. An additional safeguard is the fact that the ends of the nipples 58 are beveled so that the rubber hose connecting the nipples to the teat cups closes off the nipples when the teat cup falls downwardly, and hence the vacuum to the fallen cup is shut off.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a carry-away milking system, a milk receptacle comprising, a bowl having an opening at its top and at its bottom, a lid having a portion to make liquid-tight contact with the bowl around said opening in the top thereof, with said lid being provided with nipples to be directly connected to the milk tubes of a plurality of teat cup assemblies, a base having a portion to make liquid-tight contact with the bowl around the opening in the bottom thereof, means interconnecting the lid and base for clamping said bowl therebetween to hold said portions on said lid and base in liquid-tight contact with the bowl around said openings to form a substantially closed receptacle and to hold said receptacle in assembled condition, said receptacle when assembled having an overall height less than the normal distance between the udder of a cow and the floor of the stall in which the cow is standing, an outlet pipe on the base forming a passage opening into the assembled receptacle, and a limiting member attached to the bottom of said base and extending downwardly therefrom, said member having a length at least sufficient to prevent a teat cup assembly hanging downwardly from a nipple from touching said floor.

2. The receptacle of claim 1 in which said limiting member is in the form of a leg movably attached to the bottom of said base and movable thereon from a first position extending substantially vertically downwardly from said receptacle to a second position wherein said leg is displaced toward the horizontal from the first position.

3. In a carry-away milking system, a milk receptacle comprising, a bowl having an opening at its top and at its bottom, a lid having a portion to make liquid-tight contact with the bowl around said opening in the top thereof, with said lid being provided with nipples to be directly connected to the milk tubes of a plurality of teat cup assemblies, a base having a portion to make liquid-tight contact with the bowl around the opening in the bottom thereof, means interconnecting the lid and base for clamping said bowl therebetween to hold said portions on said lid and base in liquid-tight contact with the bowl around said openings to form a substantially closed receptacle and to hold said receptacle in assembled condition, said receptacle when assembled having an overall height less than the normal distance between the udder of a cow and the floor of the stall in which the cow is standing, and an outlet pipe on the base forming a passage opening into the assembled receptacle.

4. The receptacle of claim 3 in which said bowl is transparent.

5. The receptacle of claim 3 in which there are four nipples on the lid and in which said bowl has a volumetric capacity more than the volume of milk delivered at a single pulsation but substantially less than the normal volume of milk delivered by a cow at a single milking.

6. The receptacle of claim 3 including a perforated plate in said base adapted to support a filter pad, a gasket for maintaining a filter pad in place against said perforated plate with said gasket constituting said portion of the base to be clamped in liquid-tight contact with the bowl around the opening in the bottom thereof.

UNITED STATES PATENTS

References Cited in the file of this patent

| | | |
|---|---|---|
| 967,513 | Groff | Aug. 16, 1910 |
| 1,396,987 | Bodeker | Nov. 15, 1921 |
| 1,408,326 | Wilmotte | Feb. 28, 1922 |
| 1,719,395 | Dugas | July 2, 1929 |
| 1,776,909 | Hull | Sept. 30, 1930 |
| 1,785,313 | Keener | Dec. 16, 1930 |
| 1,859,213 | McCornack | May 17, 1932 |
| 1,910,830 | Hapgood | May 23, 1933 |
| 1,972,144 | Hapgood | Sept. 4, 1934 |
| 1,977,511 | Graves | Oct. 16, 1934 |
| 2,102,267 | Hodsdon | Dec. 14, 1937 |
| 2,518,589 | Anderson | Aug. 15, 1950 |
| 2,610,608 | Graves | Sept. 16, 1952 |
| 2,613,636 | Babson | Oct. 14, 1952 |

FOREIGN PATENTS

| | | |
|---|---|---|
| 26,015 | Sweden | Nov. 29, 1906 |
| 22,956 | France | Mar. 28, 1921 |
| | (1st addition to No. 464,999) | |
| 669,868 | France | Aug. 10, 1929 |
| 322,202 | Great Britain | Dec. 2, 1929 |
| 9197/32 | Australia | Sept. 5, 1933 |
| 105,472 | Australia | Oct. 12, 1938 |